US012697756B2

(12) United States Patent　　　(10) Patent No.:　US 12,697,756 B2
Hatta et al.　　　　　　　　　　　(45) Date of Patent:　　　Aug. 4, 2026

(54) METHOD FOR MANUFACTURING GLASS PLATE EQUIPPED WITH VEHICLE WINDOW-TYPE RESIN FRAME

(71) Applicant: AGC Inc., Tokyo (JP)

(72) Inventors: Naonori Hatta, Tokyo (JP); Eita Nagamura, Tokyo (JP); Mineo Mori, Tokyo (JP)

(73) Assignee: AGC INC., Tokyo (JP)

( * ) Notice: Subject to any disclaimer, the term of this patent is extended or adjusted under 35 U.S.C. 154(b) by 92 days.

(21) Appl. No.: 18/746,026

(22) Filed: Jun. 17, 2024

(65) Prior Publication Data

US 2024/0335988 A1　　Oct. 10, 2024

Related U.S. Application Data

(63) Continuation of application No. PCT/JP2022/045510, filed on Dec. 9, 2022.

(30) Foreign Application Priority Data

Dec. 22, 2021　　(JP) ................................. 2021-208167

(51) Int. Cl.
　　*B29C 45/14*　　　　　(2006.01)
　　*B29C 45/77*　　　　　(2006.01)
　　　　　　(Continued)

(52) U.S. Cl.
　　CPC .. *B29C 45/14434* (2013.01); *B29C 45/14065* (2013.01); *B29C 45/77* (2013.01);
　　　　　　(Continued)

(58) Field of Classification Search
None
See application file for complete search history.

(56) References Cited

U.S. PATENT DOCUMENTS

2011/0272859 A1* 11/2011 Sitterlet ............ B29C 45/14418
　　　　　　　　　　　　　　　　　425/546
2016/0354963 A1* 12/2016 Zhang ............... B29C 45/14778
　　　　　　　　　　(Continued)

FOREIGN PATENT DOCUMENTS

JP　　H-013 177 34 A　 * 12/1989
JP　　H07-223847 A　　8/1995
　　　　　　(Continued)

OTHER PUBLICATIONS

Higuchi et al., "Effect of Processing Conditions on Flash Generation," Polymer Engineering and Science, vol. 45, Issue 2, 2005, pp. 238-247.

(Continued)

*Primary Examiner* — Mohammad M Ameen
(74) *Attorney, Agent, or Firm* — Foley & Lardner LLP

(57)　　　　　ABSTRACT
A method for manufacturing a glass plate equipped with a vehicle window-type resin frame includes performing injection molding of the resin frame by using two shaping molds having a cavity configured for the resin frame, disposing the glass plate inside the shaping molds such that the glass plate is retained by a retaining part that is adjacent to the cavity of the shaping molds, and injecting a resin into the cavity, wherein there is at least a partial gap between the glass plate and the retaining part, in a state in which the shaping molds are clamped together.

12 Claims, 7 Drawing Sheets

(51) Int. Cl.
B29C 45/78 (2006.01)
*B29K 29/00* (2006.01)
*B29K 709/08* (2006.01)
*B29L 31/30* (2006.01)

(52) U.S. Cl.
CPC .... B29C 45/78 (2013.01); *B29C 2945/76006* (2013.01); *B29C 2945/7604* (2013.01); *B29C 2945/761* (2013.01); *B29C 2945/76257* (2013.01); *B29C 2945/76384* (2013.01); *B29C 2945/76498* (2013.01); *B29C 2945/76531* (2013.01); *B29C 2945/76862* (2013.01); *B29K 2029/14* (2013.01); *B29K 2709/08* (2013.01); *B29K 2995/0013* (2013.01); *B29L 2031/3052* (2013.01)

(56) References Cited

U.S. PATENT DOCUMENTS

| | | | | |
|---|---|---|---|---|
| 2018/0208036 A1* | 7/2018 | Muylkens | ............. | B60J 10/777 |
| 2019/0366604 A1* | 12/2019 | Takahashi | ......... | B29C 45/14467 |

FOREIGN PATENT DOCUMENTS

| | | | |
|---|---|---|---|
| JP | 2012-515101 | A | 7/2012 |
| JP | 6065221 | B2 | 1/2017 |
| JP | 2018-523604 | A | 8/2018 |
| JP | 6416940 | B2 | 10/2018 |
| JP | 2019-209614 | A | 12/2019 |

OTHER PUBLICATIONS

International Searching Authority, "International Search Report," issued in connection with International Patent Application No. PCT/JP2022/045510, dated Jan. 17, 2023.

International Searching Authority, "Written Opinion," issued in connection with International Patent Application No. PCT/JP2022/045510, dated Jan. 17, 2023.

\* cited by examiner 31    80    5    cv gp

M2

H

M1 cv

Z
L W

METHOD FOR MANUFACTURING GLASS PLATE EQUIPPED WITH VEHICLE WINDOW-TYPE RESIN FRAME

CROSS-REFERENCE TO RELATED APPLICATION

The present application is a continuation application of International Application No. PCT/JP2022/045510, filed Dec. 9, 2022, which claims priority to Japanese Patent Application No. 2021-208167 filed Dec. 22, 2021. The contents of these applications are incorporated herein by reference in their entirety.

BACKGROUND OF THE INVENTION

1. Field of the Invention

The present disclosure relates to a method for manufacturing a glass plate that is equipped with a vehicle window-type resin frame.

2. Description of the Related Art

A glass plate equipped with an automobile window-type resin frame is a resin-made frame that is integrated with a peripheral edge portion of an automobile window glass plate. The glass plate equipped automobile window-type resin frame can be manufactured by attaching a glass plate to a shaping mold and then forming a resin frame into a single piece by injecting resin into a cavity formed in the shaping mold until the shaping mold is full. In the manufacturing of such a glass plate-equipped automobile window-type resin frame, it is imperative to use an injection pressure that is high to a certain extent in order to obtain a resin frame of sufficient quality, but when the pressure of the resin is high, the glass plate gets subjected to high load, and as a consequence of this, breaking or cracking of the class may occur.

In attempt to address this, Patent Literature 1, for example, describes a method for manufacturing a frame-equipped glass plate by using a material obtained by mixing two types of specific vinyl chloride-based resins at a specific ratio, resulting in a manufacturing a frame-equipped glass plate that is good in appearance even when the injection pressure is such that no breaking occurs.

However, there is demand for a method for manufacturing an automobile window-type resin frame-equipped glass plate without damaging the glass plate yet without limiting use to the resin described in Patent Literature 1.

An object of one aspect of the present disclosure is to provide a method for manufacturing an automobile window-type resin frame-equipped glass plate by which damage to the glass plate is substantially prevented regardless of the resin material that is used.

CITATION LIST

Non-Patent Literature

[Patent Literature 1] Japanese Unexamined Patent Application Publication No. H7-223847

SUMMARY OF THE INVENTION

In order to solve the aforementioned issue, one aspect of the present disclosure is a method for manufacturing a glass plate equipped with a vehicle window-type resin frame, the manufacturing method including:

performing injection molding by:

using two shaping molds having a cavity corresponding to the resin frame;

disposing the glass plate inside the shaping molds such that the glass plate is retained by a retaining part that is adjacent to the cavity of the shaping molds; and injecting a resin into the cavity to create the resin frame, wherein there is at least a partial gap between the glass plate and the retaining part, in a state in which the shaping molds are clamped together.

According to the one aspect of the present disclosure, a method for manufacturing the automobile window type-resin frame-equipped glass plate in which damage to the glass plate is substantially prevented regardless of the resin material that is used.

DESCRIPTION OF THE PREFERRED EMBODIMENTS

Figure 1:
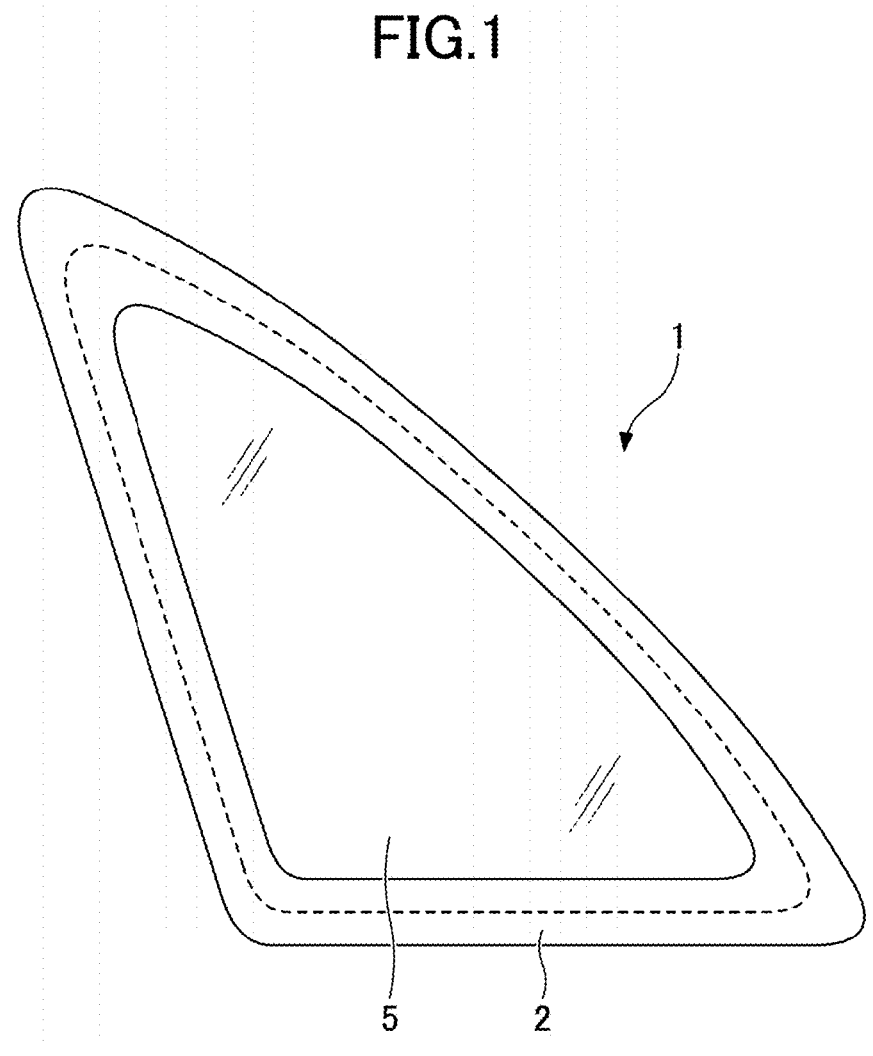
FIG. 1 illustrates an example of an automobile window type-resin frame-equipped glass plate that is manufactured according to an embodiment of the present disclosure.

Embodiments of the present disclosure are described below. In the drawings, unless otherwise specified, the same or corresponding components are denoted by the same reference numerals, and the description thereof may be omitted.

<Automobile Window-Type Resin Frame-Equipped Glass Plate>

FIG. 1 illustrates an example of an automobile window type-resin frame-equipped glass plate 1 that is manufactured according to an embodiment of the present disclosure. The plan view of FIG. 1 is a drawing of a resin frame-equipped glass plate 1, as viewed from a vehicle interior. As illustrated in FIG. 1, the automobile window-type resin frame-equipped glass plate 1, i.e., the glass plate with a resin frame serving as a window for an automobile, can be configured as a module assembly window, also known as MAW (registered trademark) having a glass plate 5 and a resin frame 2 formed on a peripheral edge portion of the glass plate 5. In the case of a module assembly window, the entire frame of the window glass can be fitted to the window frame of the automobile, and thus assembly of the automobile can be simplified, and a structure has both high air-tightness and high water-tightness. In the present application, the terms "integrated" and "monolithically" refer to a state in which components are not disassembled in a normal operation of attaching the window member to a vehicle body. The glass plate with a resin frame for an automobile window obtained by the present embodiment can be used front vent glass, rear quarter glass, rear glass, side glass, a windshield, roof glass, or the like. Among these, the automobile window-type resin frame-equipped glass plate obtained by the present embodiment can be suitably used as a window member that can be neither opened or closed, particularly as front vent glass or rear quarter glass.

The glass plate 5 that is used in the automobile window-type resin frame-equipped glass plate 1 may be a glass plate that is for an automobile window but this is by no means a limitation. The glass to be used for the glass plate 5 may be made of inorganic glass, or more specifically, may be made of soda lime silicate glass, aluminosilicate glass, borate glass, lithium aluminosilicate glass, borosilicate glass, or the like. The process of shaping the glass plate 5 is not particularly limited, however, the glass plate 5 is preferably shaped by a float process or the like, for example. The glass plate 5 may be non-tempered glass or may be tempered glass that is subjected to a tempering treatment such as an air-cooled tempering treatment or a chemical tempering treatment. The non-tempered glass is obtained by shaping molten glass into a plate, and then slowly cooling the plate. The tempered glass is glass having a compressive stress layer formed on the surface of the non-tempered glass, and the tempered glass may be either physically tempered glass (for example, thermally tempered glass) or chemically tempered glass. In the case where thermally tempered glass is used, the surface of the glass may be tempered by quenching the uniformly heated glass plate from a temperature near the softening point, and inducing a compressive stress on the glass surface from the temperature difference between the glass surface and the inside of the glass. Also, when the tempered glass is chemically tempered glass, the surface of the glass may be tempered by inducing a compressive stress on the glass surface by ion exchange method or the like.

The glass plate 5 may be a glass plate that absorbs ultraviolet rays or infrared rays. The glass plate 5 is preferably transparent but the glass plate 5 may be colored to an extent that its transparency is not impaired.

The shape of the glass plate 5 in a plan view is not particular limited and may be triangular, square-shaped, another polygonal shape, circular, or an ellipse. The top part of the glass plate 5 may or may not be round. Also, the thickness of the glass plate 5 may be 0.2 mm to 5 mm, or preferably is 0.3 mm to 2.4 mm.

The glass plate 5 to which the resin frame 2 is to be equipped may be laminated glass including multiple panes of the aforementioned glass plates laminated together, instead of being a single pane. The laminated glass may be formed by laminating multiple aforementioned glass plates joined via an interlayer containing a thermoplastic resin. The interlayer for the laminated glass may be a thermoplastic resin, and examples of the thermoplastic resin include plasticized polyvinyl acetal-based resins, plasticized polyvinyl chloride-based resins, saturated polyester-based resins, plasticized saturated polyester-based resins, polyurethane-based resins, plasticized polyurethane-based resins, ethylene-vinyl acetate copolymer-based resins, ethylene-ethyl acrylate copolymer-based resins, cycloolefin polymer resins, ionomer resins, and so forth. Also, a resin composition that contains a modified block copolymer hydride described in Japanese Patent No. 6065221 is also suitably used. Among these, the plasticized polyvinyl acetal-based resins is suitably used because it has a superior balance of properties including transparency, weather resistance, strength, adhesive strength, penetration tolerance, impact energy absorption, moisture resistance, heat insulation, and acoustic insulation. One of these thermoplastic resins may be used alone, or two or more types may be used in combination. Note that the term "plasticized" in the "plastic polyvinyl acetal resin" described above means having been plasticized by adding a plasticizer. The same applies to the other plasticized resins. The interlayer may be a resin that does not contain a plasticizer, such as an ethylene-vinyl acetate copolymer resin or the like. Examples of the polyvinyl acetal resin described above include polyvinyl formal resin obtained by having polyvinyl alcohol ("PVA") react with formaldehyde; polyvinyl acetal resin in a narrow sense obtained by having PVA react with acetaldehyde; and polyvinyl butyral resin ("PVB") obtained by having PVA react with n-butyraldehyde; and the like. In particular, PVB is suitable because of its superior balance of properties including transparency, weather resistance, strength, adhesive strength, penetration tolerance, impact energy absorption, moisture resistance, heat insulation, and acoustic insulation. Note that one of these polyvinyl acetal-based resins may be used alone, or two or more types may be used in combination.

In a case where the glass plate 5 is included in the laminated glass, the thickness of the glass plate situated on the vehicle-exterior side is preferably greater than or equal to 1.1 mm and less than or equal to 3 mm at the thinnest portion. If the thickness of the glass plate situated on the vehicle-exterior side is greater than or equal to 1.1 mm, the strength in terms of stone-chip resistance or the like is sufficient, and if the thickness is less than or equal to 3 mm, the mass of the laminated glass is not too large, and thus is favorable in terms of fuel efficiency of the vehicle. The thickness of the glass plate situated on the vehicle-exterior side, at the thinnest portion, is 1.6 mm or greater and 2.8 mm or less, more preferably 1.6 mm or greater and 2.3 mm or less, and even more preferably 1.6 mm or greater and 2.0 mm or less. The thickness of the glass plate situated on the vehicle-interior side is preferably 0.3 mm or greater and 2.3 mm or less. When the thickness of the glass plate situated on the vehicle-interior side is greater than or equal to 0.3 mm, handleability is good. Likewise, when the thickness of the glass plate situated on the vehicle-interior side is less than or equal to 2.3 mm, the weight does not become excessive.

The glass plate 5 may have a unidirectionally curved shape curved only in one direction, or may have a multi-directionally curved shape curved in two directions (for example, a predetermined direction and a direction perpendicular to the predetermined direction). For the bend shaping, gravity forming, press forming, or the like is used. In a case where the glass plate is curved by being shaped to have a predetermined curvature, the radius of curvature of the glass plate 5 may be 1,000 mm to 100,000 mm. Even in a case where the curved glass plate is used, damage to the glass plate during injection molding of the resin frame can be satisfactorily prevented by the manufacturing method of the present embodiment.

The resin frame 2 is formed on the peripheral edge portion of the glass plate 5. As illustrated in FIG. 1, the resin frame 2 may be provided on the entirety of the peripheral edge portion of the glass plate 5 or may be provided on only part of the peripheral edge portion, and can a shaping mold configured for the predetermined configuration can be used. The resin frame 2 may be continuous or discontinuous in the peripheral direction. As illustrated in FIG. 1, the resin frame 2 is preferably provided so as to cover the peripheral edge portion of the glass plate 5, that is, in contact with both main surfaces (vehicle-exterior surface and vehicle-interior surface) and the end surfaces of the glass plate 5. However, the resin frame 2 may instead be provided in contact with only one main surface (vehicle-exterior surface or vehicle-interior surface) and the end surface. The resin frame 2 may be provided on a main surface of the glass plate 5 in an area from the end edge (or the position of the end surface) of the glass plate 5 to a position 3 mm or more and 150 mm or less from the end edge (or the position of the end surface) of the glass plate 5, on the vehicle-outer surface, and may be 3 mm or more and 200 mm on the vehicle-interior surface.

The resin used to form the resin frame 2 is not particularly limited as long as the product integrated with the glass plate 5 can be formed, but it is preferable that the resin can be used in injection molding, that is, it can be plasticized or melted, and then solidified by cooling. The resin used for the resin frame 2 may be a thermoplastic resin, for example, polyvinyl chloride, polyolefin, polyester, polystyrene, polyamide, polyurethane, or the like.

Furthermore, the peripheral edge portion of the glass plate 5 may be provided with a blocking layer (also called black ceramic) along at least the vehicle-interior surface. The blocking layer is a layer that protects sealants or the like for adhering and holding a glass plate for a vehicle to the car body, and can be formed by applying and baking a colored ceramic paste (glass paste). The color the blocking layer may be black or may be gray, brown, or the like as well. The color of the blocking layer can be imparted by selecting the color of the pigment contained in the ceramic paste.

Also, at least the surface on which the resin is to be provided, of the glass plate 5, may be coated with a primer for enhancing adhesiveness.

<Manufacturing of Automobile Window-Type Resin Frame-Equipped Glass Plate>

(Overview of Manufacturing Apparatus)

Figure 2:
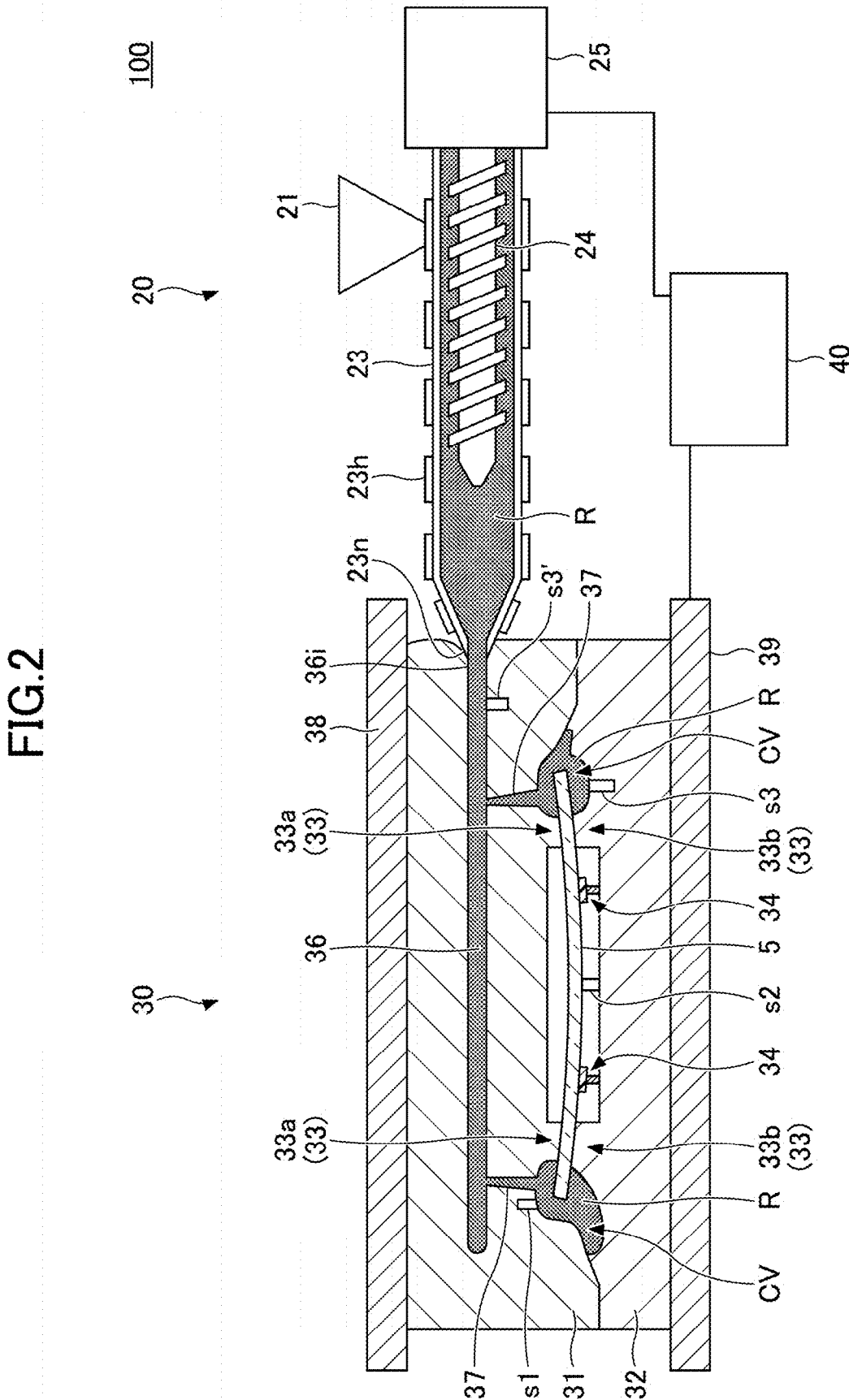
FIG. 2 is a schematic view of a manufacturing apparatus that is used in the embodiment of the present disclosure for manufacturing the automobile window type-resin frame-equipped glass plate.

An overview of a manufacturing apparatus 100 that is used with the method for manufacturing the automobile window-type resin frame-equipped glass plate according to the present embodiment is illustrated in FIG. 2. The manufacturing apparatus 100 for manufacturing the automobile window-type resin frame-equipped glass plate includes an injection unit 20 that injects resin and a shaping unit 30 that shapes the frame by using the resin injected by the injection unit 20. The injection unit 20 may be equipped with both a cylinder 23 that can store the plasticized or molten resin therein and a screw 24 that can move inside the cylinder 23 along the axial direction of the cylinder 23. In the present example, the aforementioned axial is also the axial direction of the screw 24. The resin material can be fed into the cylinder 23 from a hopper 21 that is provided on the upstream side of the cylinder 23. Further, the outer circumferential surface of the cylinder 23 may be provided with a cylinder heater 23h. A resin R that is inside the cylinder 23 is heated by the cylinder heater 23h and is plasticized or molten at a predetermined temperature. The plasticized or molten resin is injected to the outside of the injection unit 20 via a nozzle 23n by rotation and or driving of the screw 24.

Figure 4:
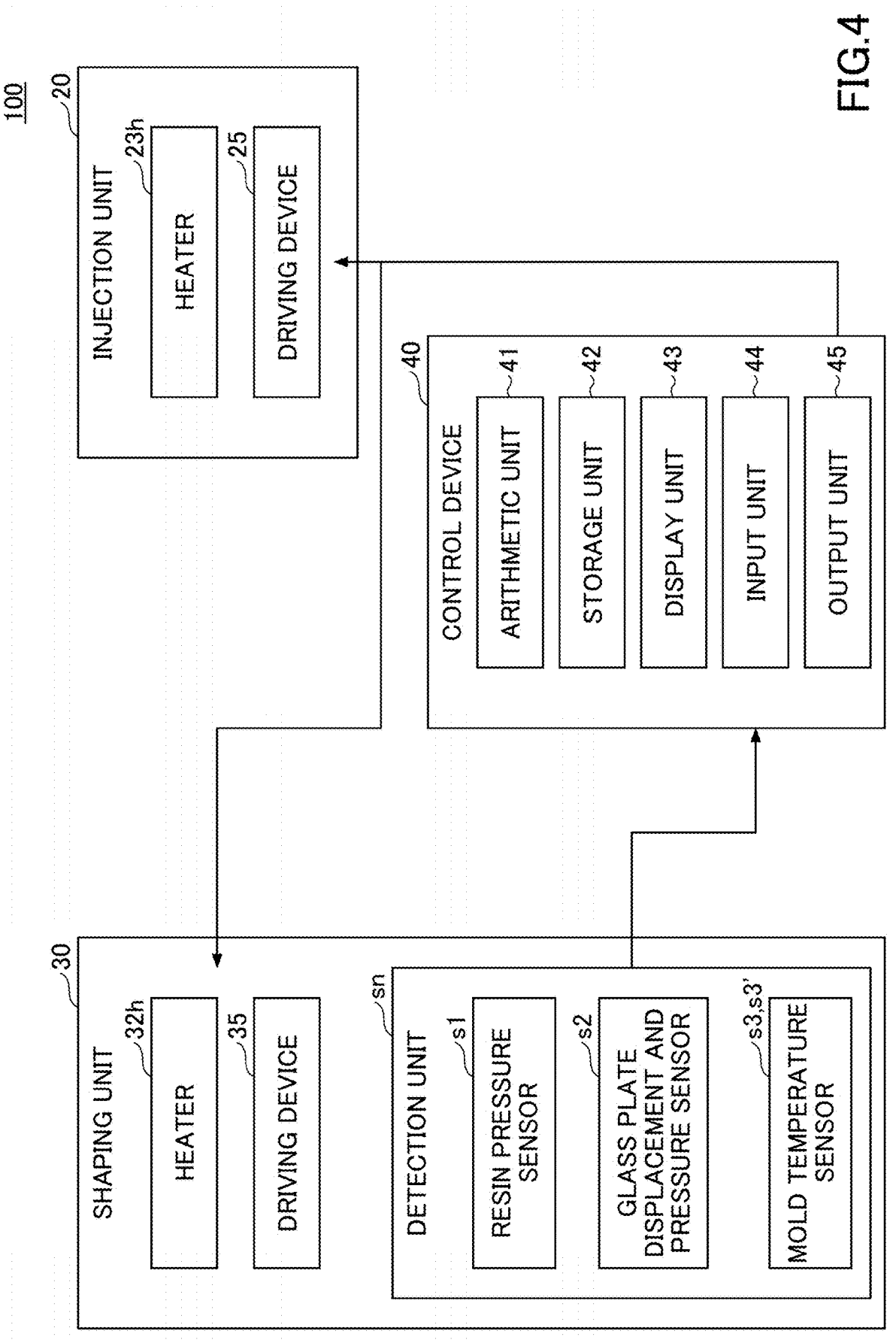
FIG. 4 is a functional block diagram for control of injection molding in the method for manufacturing the automobile window type-resin frame-equipped glass plate according to the embodiment of the present disclosure.

The shaping unit 30 is equipped with a shaping mold. The shaping mold used in the present embodiment is an opening and closing type-mold having a upper mold 31 and an lower mold 32, forming a pair, and may be configured such that the upper mold 31 is a movable-type mold and the lower mold 32 is a fixed-type mold. The upper mold 31 is attached to an upper platen 38 whereas the lower mold 32 is attached to a lower platen 39. The upper platen 38 and the lower platen 39 are provided with a driving device 35 (functions are illustrated in FIG. 4). The driving device 35 can perform the operation of mold clamping and mold opening and the adjustment of the degree of mold clamping. Further, in a state where the shaping molds 31 and 32 are clamped, a cavity CV having a shape corresponding to the resin frame 2 (FIG. 1) to be obtained is formed. In addition, in a state where the shaping molds 31 and 32 are clamped, the glass plate 5 can be held by a retaining part 33 at a position adjacent to the cavity CV. The retaining part 33 has an upper retaining part 33a of the mold and a lower retaining part 33b of the mold, and retains the glass plate 5 from above and below.

When the shaping molds 31 and 32 are to be filled with resin, the nozzle 23n of the cylinder 23 of the injection unit 20 is connected to an inlet 36i of the shaping unit 30 as illustrated in FIG. 2. The plastic material R can reach the cavity CV through a manifold 36 and sprues 37 via the inlet 36i. The shaping molds 31 and 32 are provided with heaters 32h (illustrated in FIG. 4 and further below), and because of this, the resin R in the shaping molds 31 and 32 can be maintained at a predetermined temperature. The heater 32h may be disposed in the vicinity of the manifold 36, and thus the shaping molds 31 and 32 can be hot runner-type shaping molds.

The shaping molds 31 and 32 are preferably molds made of metal (metal molds) so that the heat of the heater can be quickly conducted to the resin R. In such a case, the metal used may be a metal having a high thermal conductivity, for example, 10 W/mK to 500 W/mK, inclusive, preferably 70 W/mK to 500 W/mKm, inclusive, and more preferably 300 W/mK to 500 W/mK, inclusive. Specifically, copper or silver is preferably used as the material of the metal molds.

Figure 6:
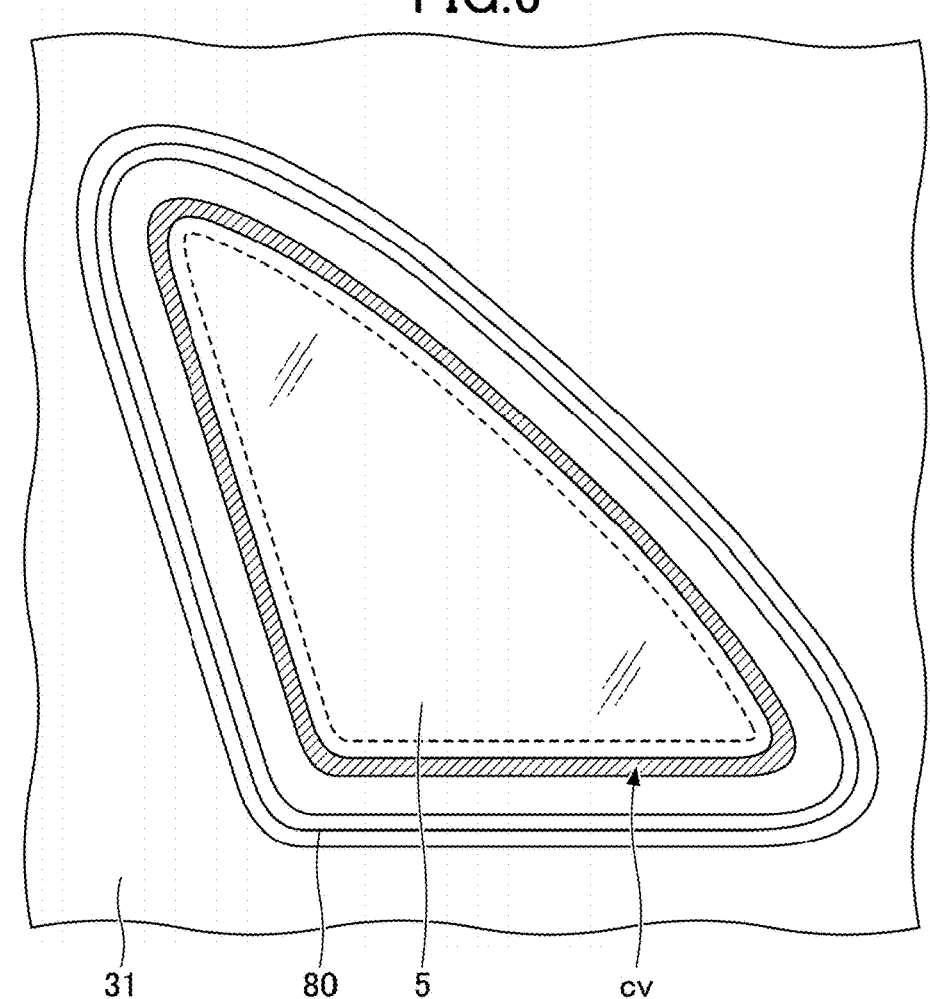
FIG. 6 is a diagram for describing a configuration of cooling piping that can be used in the embodiment of the present disclosure.

Further, the shaping molds 31 and 32 may be provided with cooling piping in addition to the aforementioned heater. The heater and the cooling piping enable more accurate temperature control of the shaping molds 31 and 32. Cooling piping 80 is preferably disposed so as to surround the cavity CV in a plan view, and more preferably, the cooling piping 80 is disposed such that the distance of the cooling piping 80 from the cavity CV is substantially the same (FIG. 6). The distance (distance in the horizontal direction) between the cooling piping 80 and the cavity CV in plan view is preferably less than or equal to 20 mm, and more preferably less than or equal to 10 mm. The cooling piping 80 formed to surround the cavity CV can be formed by, for example, a 3D metal-printer.

A resin pressure sensor s1, a glass plate displacement and pressure sensor s2, and mold temperature sensors s3 and s3' in the shaping unit 30 are also illustrated in FIG. 2. Each sensor is described further below.

(Method for Manufacturing Automobile Window-Type Resin Frame-Equipped Glass Plate)

Figure 5:
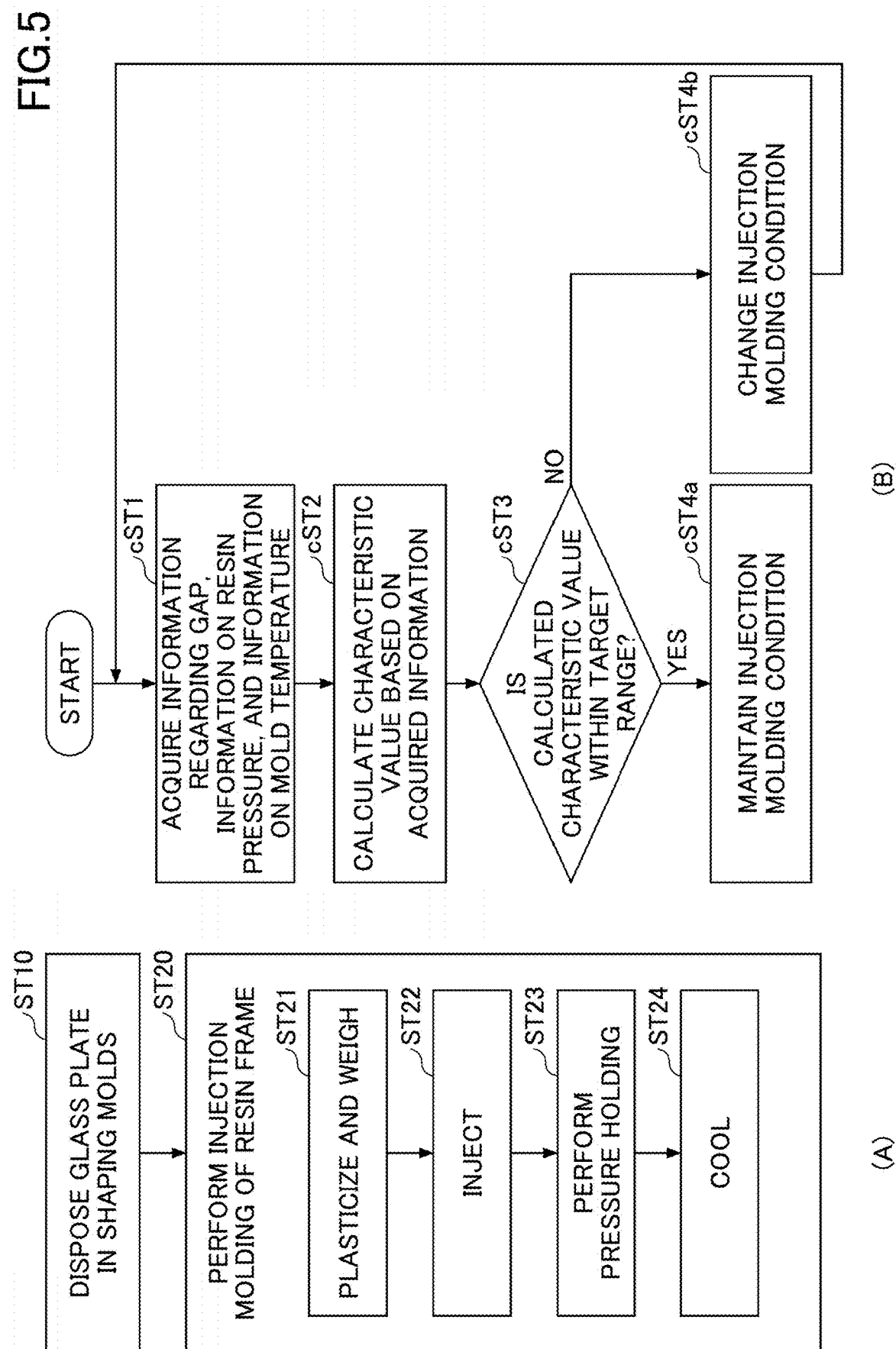
FIG. 5 is a block diagram describing the method for manufacturing the automobile window type-resin frame-equipped glass plate according to the embodiment of the present disclosure.

One embodiment of the present disclosure is a method for manufacturing an automobile window-type resin frame-equipped glass plate by performing injection molding of the resin frame 2 by using the pair of the shaping molds 31 and 32 (FIG. 2) as described above, disposing the glass plate 5 in the shaping molds 31 and 32 (ST10) and injecting the resin R into the cavity CV of the shaping molds 31 and 32 (ST20). Further, the injection-molding step (ST20) may include plasticizing or melting, and measuring the resin material in the injection unit 20 (ST21), injecting the plasticized or melted resin material into the shaping molds 31 and 32 of the shaping unit 30 (ST22), pressure holding (ST23), and cooling (ST24). (A) of FIG. 5 is a flowchart of injection molding in the method for manufacturing an automobile window-type resin frame-equipped glass plate.

In the step of disposing the glass plate 5 in the shaping molds 31 and 32 (ST10), the upper mold 31 is first opened. That is, the upper mold 31 is lifted up until it is separated from the lower mold 32, and then the glass plate 5 is placed at a predetermined position in the lower mold 32. Next, the upper mold 31 is moved downward, and the shaping molds 31 and 32 are clamped together. In the present specification, the up-down direction in the drawings may be referred to as the up-down direction or the vertical direction of the apparatus, and the direction orthogonal to the up-down direction may be referred to as the horizontal direction. In the example of the apparatus illustrated in FIG. 2, the vertical direction of the apparatus is the mold clamping direction of the shaping molds.

In the mold-clamped state illustrated in FIG. 2, the glass plate 5 is held by suction pads 34 arranged on the shaping mold 32 in a plane where the resin frame 2 is not formed. By suctioning multiple places of the glass plate 5 in a plane where the resin frame 2 is not formed by the suction pads 34, positional deviation of the glass plate 5 during the injection molding process can be prevented. The resin used for the suction pad may be a nitrile-based resin, a silicone-based resin, a fluorine-based resin, or the like.

In the example illustrated in FIG. 2, the glass plate 5 is curved to be downwardly convex in FIG. 2, but the glass plate 5 may be arranged to be upwardly convex, or a flat glass plate 5 which is not curved may be used.

A primer for enhancing adhesion may be applied in advance to at least a region of the glass plate 5 where the resin is to be provided.

Figure 3:
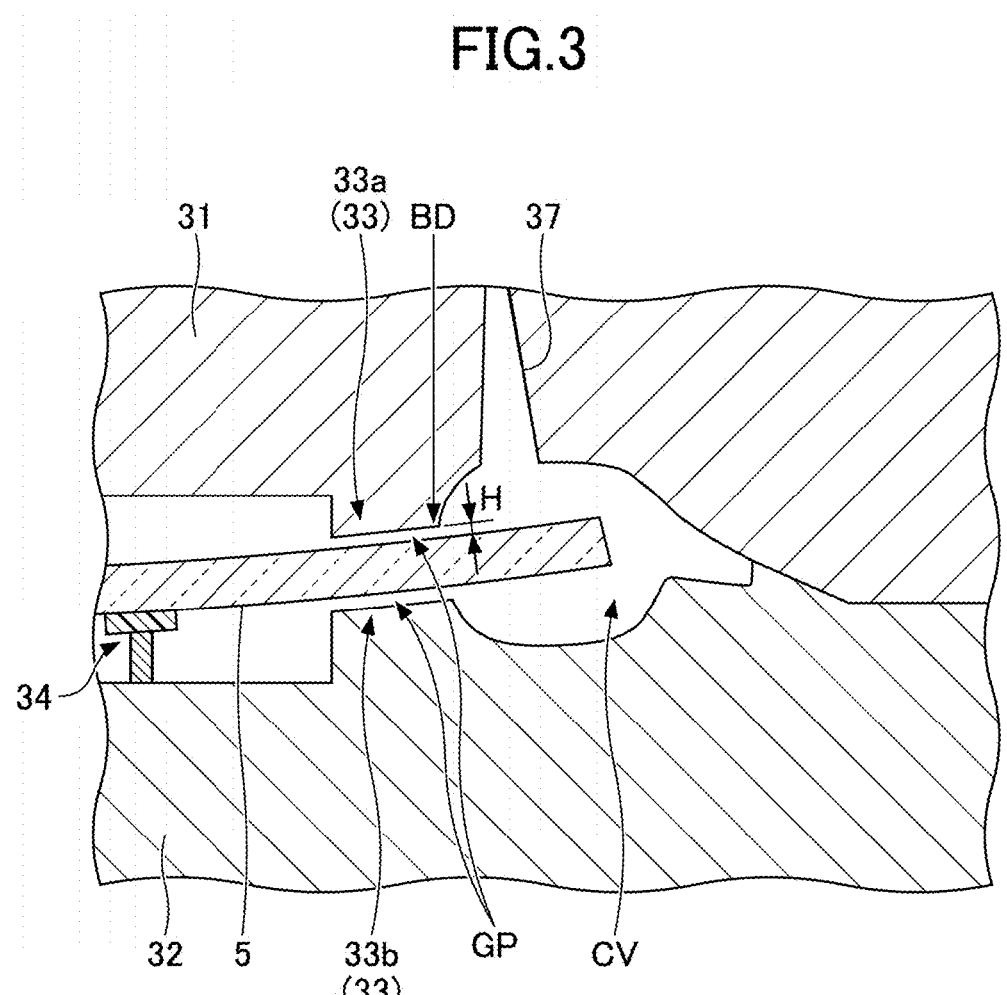
FIG. 3 is an enlarged view of part of a shaping molds illustrated in FIG. 1.

FIG. 3 is an enlarged view of the cavity CV, the retaining part 33, and the surrounding area thereof illustrated in FIG. 2, in a state in which the these components have not yet been filled with the resin R. As illustrated in FIG. 3, the glass plate 5 is retained from above and below by the retaining part 33 at a position adjacent to the inside of the cavity CV in the surface direction of the glass plate 5.

Here, from strictly the viewpoint of retaining the glass plate 5, the retaining part 33 and fixing the glass plate 5 as reliably as possible, it is conceivable to bring the surfaces of the retaining part 33 facing the glass plate 5 into contact with the glass plate 5, or to apply a force so that the retaining part 33 applies a pressure to the glass plate 5 to press the glass plate 5 from above and below thereby firmly retaining the glass plate 5. However, it is often the case that the glass plate 5 is fragile compared to the material of the mold. Moreover, the glass plate 5 might get subjected to pressure by the resin when the resin is injected into the cavity CV (ST22) or when the resin is held under pressure (ST23). In this case, unwanted stress is generated in the glass plate 5 during the injection molding of the resin frame, and when the stress increases, the glass plate 5 may become damaged. That is, the glass plate 5 may break, or a crack or an imperfection may form in the glass plate 5.

In contrast to this, in the present embodiment, a gap GP is formed between the glass plate 5 and the retaining part 33 in a state in which the shaping molds 31 and 32 are clamped, as illustrated in FIG. 3, and such a small gap GP can provide some allowance enabling the glass plate 5 itself to be deformed or displaced. Therefore, it is possible to prevent the glass plate from being subjected to unnecessary stress, especially while the resin is injected into the cavity CV until the cavity CV is full (ST22), while pressure-holding is performed (ST23) or while both the injecting (ST22) and the pressure-holding (ST23) are performed, thereby preventing damage to the glass plate.

It is sufficient as long the gap GP formed between the retaining part 33 and the glass plate 5 is formed by the retaining part 33 and the glass plate 5 being at least partially separated from each other. That is, in a state where the glass plate 5 is already disposed (ST10) prior to injection molding (ST20) of the resin, the entirety of the retaining part 33 and the entirety of the glass plate 5 may be separated from each other, or, a portion of the retaining part 33 and a portion of the glass plate 5 may be separated from each other to form a partial gap GP therebetween. In the case where the partial gap GP is formed, the gap GP may be formed so as to have an annular shape that is continuous as viewed from above (top view), or may be formed so as to be continuous as viewed in cross-sectional view (FIG. 3) taken along the vertical direction, or may be formed so as to be continuous in both the top view and the cross-sectional view. It is preferable that the gap GP is formed so as to have an annular shape that is continuous at least in plan view (top view), because this allows for deformation and displacement of the glass plate 5 over the entire peripheral edge where the resin frame is formed. Further, the gap GP is preferably formed at least at a boundary position BD (FIG. 3) with the cavity CV. It is to be noted that the configuration in which is a partial gap GP and the retaining part 33 and the glass plate 5 are partially in contact with each other is preferable from the viewpoint of improving the action of retaining the glass plate by the retaining part 33.

In the example illustrated in FIG. 3, the gaps GP are formed between upper retaining part 33*a* and the glass plate 5 and between the lower retaining part 33*b* and the glass plate 5. However, the gap GP may instead be formed between either the upper retaining part 33*a* and the glass plate 5 or between the lower retaining part 33*b* and the glass plate 5 depending on the configuration in which the glass plate 5 is supported in the shaping molds 31 and 32. Further, unlike in the example illustrated in FIG. 3, the gap GP may be formed as a partial gap or a total gap between the lower retaining part 33*b* and the glass plate 5 or as a partial gap or a total gap between the upper retaining part 33*a* and the glass plate 5. Also, the gap GP may be formed as a partial gap or a total gap between the upper retaining part 33*a* and the glass plate 5, and the lower retaining part 33*b* and the glass plate 5 may be partially or entirely in contact with each other.

The gap distance H (FIG. 3) of the gap GP may be 0.5 mm or less, and preferably is 0.2 mm or less. In the case where the glass plate 5 is flat, the gap distance H is a distance in the mold clamping direction, but in the case where the glass plate 5 is curved, the gap distance H can be set as a distance in the direction normal to the surface of the glass plate 5 on the side where the gap GP is formed. The gap distance H may be 0.5 mm or less, and is preferably 0.2 mm or less, at the boundary position BD between the retaining part 33 and the cavity CV. The gap distance H may be set to maximum at the boundary position BD between the retaining part 33 and the cavity CV.

In the injection molding (ST20), gas-assisted molding may be used. The resin frame can be made hollow by performing the gas-assisted molding while injecting the inert gas. This makes it possible to suppress the pressure of the resin in the shaping molds 31 and 32, and thus suppress the load applied to the glass plate 5. The amount of material used can be reduced and thus the cost can also be reduced.

As a configuration for substantially preventing damage to the glass plate 5, a deflection suppressing member may be disposed in the central region of the glass plate 5. The deflection suppressing member can be disposed in the shaping molds 31 and 32, for example, at a position spaced inward from the retaining part 33 so as to face the most protruding portion of the convex surface of the glass plate 5 in the case where the glass plate 5 is curved. Any deformation (deflection) of the glass plate 5 that would cause the glass plate 5 to become more convex in shape can be suppressed by the deflection suppressing member serving as a stopper. The material of the portion of the deflection suppressing member facing the glass plate 5 may be formed of metal, resin, rubber, elastomer, or the like, and the rubber or the elastomer is preferable from the viewpoint of being able to absorb the impact when coming into contact with the glass plate 5.

<Control in Manufacturing of Automobile Window-Type Resin Frame-Equipped Glass Plate>

As described above, in the manufacturing of the automobile window-type resin frame-equipped glass plate according to this embodiment, the gap GP is formed between at least a portion of both the glass plate 5 and the retaining part 33 in the state where the molds are clamped, thereby ensuring that the glass plate 5 is prevented from being damaged in the injection-molding step (ST20), particularly in either or both of the resin-injection step (ST22) and the pressure-holding step (ST23). However, the resin is likely to seep into the gap GP due to the presence of the gap GP, and thus, the resin frame 2 is more likely to have flash. In contrast, the present inventors have found that the injection-molding (ST20) can be controlled by using at least the information regarding the gap GP between the glass plate 5 and the retaining part 33. Further, the inventors have discovered that there is a characteristic value that is an indicator of the formation of flash and is calculated based on information including information related to the gap GP, and discovered that the injection mold (ST20) can be controlled in accordance with this characteristic value. In order to perform control as such, the manufacturing apparatus 100 used in the method for manufacturing an automobile window-type resin frame-equipped glass plate according to the present embodiment may further include a control device 40 (FIG. 2).

FIG. 4 illustrates an example of a functional block configuration of the manufacturing apparatus 100. In the present example, the manufacturing apparatus 100 may include the injection unit 20, the shaping unit 30, and the control device 40, and the shaping unit 30 may include a detection unit sn.

The heater included in the injection unit 20 may be the heater 23*h* disposed on the outer circumferential surface of the cylinder 23. The heater 23*h* can adjust the temperature of the resins in the cylinder 23, for example, the temperature of the resins immediately before the resins are transferred to the shaping molds 31 and 32. The heater 23*h* may be configured such that one heater set to one temperature is disposed along the entirety of the cylinder 23, or such that a plurality of heaters are disposed in the axial direction of the cylinder 23 so that the plurality of heaters can be adjusted to different temperatures (FIG. 2).

The driving device 25 included in the injection unit may be any device as long as it can rotate and move the screw 24 in the axial direction, and may be any publicly-known driving device, for example, a servo motor. The driving device 25 can change and adjust the measuring position at the time of measuring (ST21), and in turn the amount of resin injected into the shaping molds 31 and 32, the injection speed or injection flow rate of the resin at the time of injection (ST22), the pressure-holding time at the time of pressure holding (ST23), and the like.

The shaping unit 30 also includes the heater 32*h* and the driving device 35. The heater 32*h* (not illustrated in FIG. 2) heats the shaping molds 31 and 32, in turn adjusting the temperatures of the shaping molds 31 and 32 and the resins R in the shaping molds 31 and 32 to a predetermined temperature. When the shaping molds 31 and 32 are of a hot runner-type, the manifold 36 and the sprues 37 may be heated by the heater 32*h*.

The driving device 35 (not illustrated in FIG. 2) included in the shaping unit 30 may be a publicly-known device as long as it can perform the operation of mold clamping and opening of the shaping molds 31 and 32 and the adjustment of the degree of mold clamping, for example. The driving device may be a servo motor or the like. Therefore, the gap GP (FIG. 3) between the retaining part 33 of the shaping molds 31 and 32 and the glass plate 5 can also be adjusted by the driving device 35.

In the example illustrated in FIG. 4, the detection unit sn may be included in the shaping unit 30, and includes a sensor for detecting the state in the shaping unit 30. The number of sensors included in the detection unit sn may be at least one. The detector sn includes a sensor that can acquire at least information regarding the aforementioned gap GP.

The information regarding the gap GP may be the gap distance H of the gap GP or may be information that can be used for calculation or estimation of the gap distance H. In this example, the sensor for acquiring the information on the gap GP may be a sensor (glass plate displacement and pressure sensor) s2 for detecting either or both of displacement and pressure of the glass plate. That is, the gap distance H can be calculated or estimated based on the information obtained by the glass plate displacement and pressure sensor s2. In a case where the glass plate displacement and pressure sensor s2 is a sensor for detecting the displacement of the glass plate in the shaping molds 31 and 32, an optical displacement and pressure sensor, a contact displacement and pressure sensor, an ultrasonic displacement and pressure sensor, or the like can be used. In addition, in a case where the sensor detects the pressure of the glass plate 5 in the shaping molds 31 and 32, a pressure sensor such as a piezoelectric sensor, a gauge sensor, or a capacitance sensor can be used. The glass plate displacement and pressure sensor s2 may be disposed in the shaping molds 31 and 32, for example, in the central region of the glass plate 5 so as to face either of the main surfaces of the glass plate 5 (FIG. 2).

The detection unit sn may include the resin pressure sensor s1 and the mold temperature sensor s3 in addition to the glass plate displacement and pressure sensor s2. The resin pressure sensor s1 may measure the pressure of the resin in either or both of the cavity CV and the sprue 37, and preferably measures the pressure of the resin in the cavity CV. The resin pressure sensor s1 may be provided in the cavity CV of the shaping molds 31 and 32 or in the vicinity of the cavity, for example, as illustrated in FIG. 2. As the resin pressure sensor s1, a piezoelectric sensor, a piezoresistance sensor, a gauge sensor, a capacitive sensor, or the like can be used.

The mold temperature sensor s3 may measure the temperature of the shaping molds 31 and 32, in particular, the temperature of the inner surface of the wall portion of the cavity CV. The mold temperature sensor s3 may be provided in the cavities CV of the shaping molds 31 and 32 or in the vicinity of the cavities, for example, as illustrated in FIG. 2.

Further, the mold temperature sensor s3' that measures the temperature in the vicinity of the inlet 36*i* of the resin R may be used in place of the mold temperature sensor s3 or in combination with the mold temperature sensor s3. The mold temperature sensors s3' may be provided, for example, in or in the vicinity of the inlet of the manifold 36. As the mold temperature sensors s3 and s3', thermocouples, resistance temperature detectors, thermal radiation thermometers, and the like can be used.

In this embodiment, it is preferable that the resin pressure sensor s1, the glass plate displacement and pressure sensor s2, and the mold temperature sensor s3 or s3' are provided together. The information on the resin pressure in the shaping molds 31 and 32 can be obtained by the resin pressure sensor S1 and information on the temperature of the shaping molds 31 and 32 can be obtained by the mold temperature sensor s3 or the mold temperature sensor s3'. Also, the glass plate displacement and pressure sensor s2 can obtain information on either or both of the displacement and pressure of the glass plate, from which the gap can be estimated.

In the configuration illustrated in FIG. 4, although the injection unit 20 does not include a detection unit, a detection unit may be provided in the injection unit 20 in place of part of the detection unit sn in the shaping unit 30, or in addition to the detection unit sn in the shaping unit 30. For example, a resin pressure sensor may be provided in the nozzle 23*n* of the cylinder 23 in the injection unit 20, and the obtained measurement value may be used instead of the measurement value measured by the resin pressure sensor s1 provided in the shaping unit 30.

Information obtained by the detection unit sn is sent to the control device 40. The control device 40 can control the injection molding (ST20) to suppress formation of flash based on the information acquired from the detection unit sn, more specifically, at least the information regarding the gap between the glass plate 5 and the retaining part 33. The control device 40 may include an arithmetic unit 41, a storage unit 42, a display unit 43, an input unit 44, and an output unit 45.

The arithmetic unit 41 processes information by performing arithmetic operations. The information may be information acquired from the detection unit sn, and may include, for example, information acquired and stored in advance in the storage unit 42 in addition to the information acquired from the detection unit sn. In a case where a characteristic value (described later in detail) is obtained based on the acquired information and the injection-molding condition is adjusted based on the characteristic value serving as an index of the formation of flash, the calculation unit 41 can also calculate the characteristic value, determine the calculated characteristic value, and determine the condition to be adjusted based on the calculated characteristic value. The calculation unit 41 may be configured by hardware such as a central processing unit (CPU).

The storage unit 42 can store the calculation result obtained by the calculation unit 41 and information input from the input unit 44. Further, information on the resin (density, heat capacity, thermal conductivity, resin flow stop temperature, and so on of a predetermined resin at a predetermined temperature), information on the injection-molding machine to be used (cylinder diameter, screw pitch, flight width, and so on), and target value ranges of characteristic values for obtaining a desired flash length can also be stored in advance. The storage unit 42 may include a semiconductor memory, a hard disk device, and the like.

The display unit 43 is not particularly limited as long as the display unit 43 can display information (including a result of calculations, stored information, information input by an operator of the device, and the like) regarding control performed by the control device 40, and may be a display, a tablet, or the like.

The input unit 44 is used by an operator to send an instruction to the control device 40. The input unit 44 may be, for example, a keyboard, a mouse, or a touch panel attached to the screen of the display unit 43.

The output unit 45 can transmit output signals from the control device 40 to the components of the injection unit and the shaping unit 30, and may be connected to the heater 23*h* and the driving device 25 in the injection unit 20 and the heater 32*h* and the driving device 35 in the shaping unit 30. The output unit 45 enables the calculation result and the determination result that are in the calculation unit 41 to be reflected into the components of both the injection unit 20 and the shaping unit 30.

(B) in FIG. 5 illustrates an example of a flow of control performed in the manufacturing method according to the present embodiment. As illustrated in (B) of FIG. 5, information regarding the gap between the glass plate 5 and the retaining part 33, the resin pressure, and the mold temperature are obtained (cST1), a predetermined characteristic value that serves as an indicator of flash formation is calculated based on these pieces of information (cST2), and thus the injection molding (ST20) conditions can be adjusted in accordance with the calculated characteristic value. That is, the calculated characteristic value is compared with the target value range (cST3), and the injection molding (ST20) condition can be maintained (cST4*a*) or changed (cST4*b*) in accordance with the comparison result.

Here, the injection molding (ST20) condition is set by the injection unit 20, and may be one or more of: the measuring condition in the measuring step (ST21) such as a measuring position, an injection condition in the injection step (ST22) such as an injection speed and an injection flow rate of the resin, and a pressure-holding condition in the pressure-holding step (ST23) such as a pressure-holding switching position and a pressure-holding duration. The injection molding (ST20) condition that can be adjusted in the present embodiment may include conditions set in the shaping unit 30, for example, a temperature condition of the shaping molds 31 and 32.

The control illustrated in (B) of FIG. 5 can be performed at any timing in the injection-molding step (ST20) in the manufacturing of the automobile window-type resin frame-equipped glass plate ((A) of FIG. 5), preferably at any timing in the injection step (ST22) and the pressure-holding step (ST23). In this case, the result of the comparison (cST3) can be fed back during in a single iteration of the injection step. Further, a result obtained by a single iteration of the injection (one shot) or a result obtained by multiple iterations of injection may be fed back so as to be reflected in the next injection.

In a case where the characteristic value serving as the index of the flash formation is obtained and the condition of the injection molding (ST20) is adjusted in accordance with the characteristic value, the characteristic value may be, for example, dimensionless number A (–) represented by the formula (I) below $$A = P_R \times ts/\eta \qquad \text{(I)}$$

where, in the above formula, $P_R$ is the resin pressure (MPa), ts is the solidification time (sec), and n is the converted viscosity (Pa·s).

The resin pressure $P_R$ can be the resin pressure in the cavity CV or the sprue 37 measured by the resin pressure sensor s1 (FIGS. 2 and 4).

The solidification time ts (sec) is the amount of time taken for the resin to solidify, and can be a dependent function of both the gap distance H of the gap GP between the glass plate 5 and the retaining part 33 and the mold temperature Tw of the shaping molds 31 and 32. The gap distance H may be obtained by performing an actual measurement, or may be estimated from either or both of the displacement and pressure (stress) of the glass plate 5 measured by the glass plate displacement and pressure sensor s2 (FIGS. 2 and 4). The mold temperature Tw can be set as a value measured by the mold temperature sensor s3 or s3' (FIGS. 2 and 4).

The solidification time ts (sec) is an amount of time that can be represented by the following formula (II) illustrated in "Effect of Processing Conditions on Flash Generation", Polymer Engineering and Science 2005, Vol. 45, Issue 2, pp. 238 to 247.

[Math 1]

$$t_s = \int_0^{H/2} \Delta t dx = \frac{H^2 C(T - T_C)}{8\lambda(T_C - T_W)} \tag{II}$$

where, in formula (II) above, H and Tw are as described above. T is the resin temperature ($^\circ$C.), C is the heat capacity of the molten resin (J/(m$^3$·K), Tc is the temperature at which the resin flow stops ($^\circ$C.), i.e., resin flow stop temperature, $\lambda$ is the coefficient of thermal conductivity (the coefficient of thermal conductivity in the molten state) (W/mK).

The resin flow stop temperature Tc ($^\circ$C.) can be set to a value obtained by evaluating the resin physical properties by way of actual measurement (for example, by the results of specific heat measurement using a differential scanning calorimeter). It is to be noted that the temperature T may be obtained by performing actual measurement of the temperature of the resin R in the shaping molds 31 and 32, by measuring the temperature of the resins R in the cylinder 23, or may be the set temperature of the heater(s) provided in the nozzle head among the cylinder heaters 23h.

The aforementioned converted viscosity n (Pa·s) can be regarded as the viscosity of the resin reflecting the influence of the shear rate of the resin R in the cavity CV and the change in temperature, and is a dependent function of the aforementioned gap distance H described above. The converted viscosity n can be obtained, for example, from an approximation formula of the Cross-WLF model, for example. In a case where a formula of the Cross-WLF model is used, the shear rate y can be obtained by approximated by y=6354.6e$^{18622H}$, where H is the aforementioned gap distance (mm).

The inventors of the present application have discovered that the length of the flash along the plane direction of the glass plate 5 tends to be longer the greater the dimensionless number A is. Therefore, in this embodiment, a target value or a target range of the dimensionless number A is set in advance in accordance with the desired flash length, the dimensionless number A is calculated based on information obtained from the detection unit sn during injection molding (ST20), and the injection-molding operation is performed such that the calculated dimensionless number A does not exceed the target value or the target range, and thus flash can be suppressed.

When the calculated dimensionless number A is compared with the target value and the calculated dimensionless number A is greater than the target value, the conditions can be adjusted so as to at least: reduce the resin pressure $P_R$, reduce the solidification time ts, or increase the converted viscosity n. For example, the resin pressure $P_R$ can be reduced by reducing the injection speed or reducing the holding pressure. Further, the solidification time ts can be reduced by reducing the mold temperature Tw by adjusting the heaters provided in the shaping molds 31 and 32.

The characteristic value to serve as an index of flash formation is not limited to the dimensionless number A, and may a value having a correlation with the flash length obtained by using at least the information regarding the aforementioned gap GP. Therefore, the characteristic value may be such that the flash length is lower the lower the characteristic value is. The calculated characteristic value at the time of injection molding (ST20) is compared with the target value range of the previously set characteristic value, and while the calculated characteristic value is within the target value range, the condition of injection molding (ST20) is maintained as is (cST4a), and when characteristic value exceeds the target value range, the condition of injection molding (ST20) is changed (cST4b).

In this way, according to the manufacturing method of the present embodiment, damage to the glass plate 5 can be prevented by the gap GP between the retaining parts 33 and the glass plate 5 of the shaping molds 31 and 32, and any flash formed on the resin frame 2 can be suppressed even if such a gap GP exists.

Moreover, in the present embodiment, the state in which flash formation occurs can be predicted from the characteristic value by using the correlation between the characteristic value and the flash length as described above. Therefore, for example, information regarding the gap, information on the resin pressure, and information on the mold temperature can be acquired from the detection unit sn (sensors s1, s2, and s3 or s3'), and the characteristic value obtained from these pieces of information can be used as an index for production control. By using such an index, the burden of actual product inspection can be reduced. That is, a spot inspection can be performed instead of performing on inspection of all products.

EXAMPLES

Figure 7:
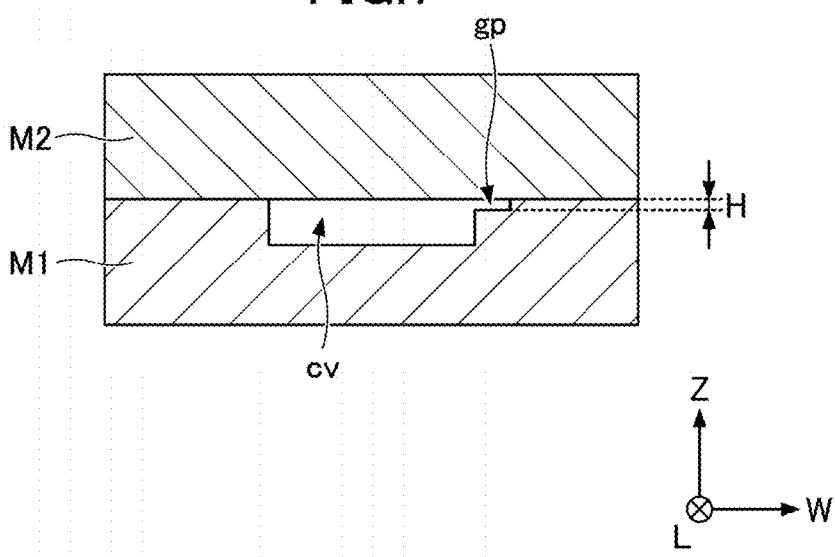
FIG. 7 illustrates a shape of a metal mold used in the Examples.

A flat plate test specimen that is approximately 250 mm in length×21 mm in width×3 mm in thickness was injection molded under conditions simulating the manufacturing of an automobile window-type resin frame-equipped glass plate. More specifically, using a metal mold having both a lower mold M1 in which a groove corresponding to the dimensions of the test specimen is formed and an upper mold M2 in which the surface facing the lower mold is flat was used, resin was injected into a cavity cv formed by the lower mold and the upper mold. However, in the metal mold used in this experiment, a gap gp was formed in a portion (the peripheral edge portion in the width direction of the groove) adjacent to the cavity cv formed when the upper mold and the lower mold were clamped. FIG. 7 illustrates a cross-sectional view of the metal mold in the clamped state used in this experiment, taken along the width direction W at the position where the gap gp was formed. As illustrated in FIG. 7, the gap gp is formed adjacent to the outer side of the cavity cv in the width direction and is continuous with the cavity cv. In this experiment, in order to investigate the effect of the gap distance H of the gap gp, a plurality of gaps having different gap distances H are provided along the longitudinal direction L of the groove and separated from each other in the longitudinal direction L. The respective gap distances H were set as 30 μm, 50 μm, 100 μm, 150 μm, 200 μm, 250 μm, and 300 μm. Each gap gp is formed in the range of 5 mm in the width direction W and 10 mm in the length direction L from the end edge of the cavity CV in the width direction W.

The main components of the raw material resins R1 to R3 used for forming the test specimens were as follows, and all of them were pellet-shaped materials.

Resin R1: Styrene-ethylene/butene copolymer and polypropylene.

Resin R2: Soft vinyl chloride (hardness 65).

Resin R3: Soft vinyl chloride (hardness 75)

A screw-type injection-molding machine ("JT100AD-110V" manufactured by Nippon Steel Corporation, screw diameter: 35 mm) was used to inject resin into the metal mold, and the injection-molding conditions were as follows for resins R1 to R3.

Measurement position: 35 mm

Resin heating conditions: 6 heaters arranged from the bottom of the hopper (HP) to the nozzle base (NH) and the nozzle tip (LNH) were heated under respective predetermined temperature conditions (Table 1)

Metal mold temperature: 40° C.

Injection speed: 60 mm/s

Pressure-holding switching position: 10 mm

Pressure-holding duration: 20 seconds

Pressure-holding pressure: 20 MPa, 30 MPa, 40 MPa, and 50 MPa; Suck back: 3 mm

Cooling duration: 30 seconds

For resins R1 to R3, the holding pressure was changed as described above and injection-molding was performed, respectively, and the length f in the width direction W of the flash formed on the peripheral edge portion in the width direction of the obtained flat plate test specimen was measured. For one pressure-holding condition of one resin, experiments were conducted at three different minimum cushion positions, and the flash length f was obtained as the average of the three.

The resin pressure $P_R$ (MPa) during injection-molding was measured by a sensor ("Type 6183" manufactured by Kistler Corporation) attached in the vicinity of the cavity of the metal mold. The value of the resin pressure $P_R$ to be used in the calculation of the dimensionless number A described below can be set as the maximum pressure that is measured during one injection-molding process.

For each of the obtained test specimens (for each molding trial), a dimensionless number A(−) represented by the following formula was obtained, and the relationship with the flash length f (mm) was examined.

$$A = P_R \times ts/\eta \tag{I}$$

$P_R$ in the formula (I) above is the aforementioned resin pressure. Further, ts is the solidification time and was obtained by formula (II) below.

[Math 2]

$$t_s = \int_0^{H/2} \Delta t dx = \frac{H^2 C(T - T_C)}{8\lambda(T_C - T_W)} \tag{II}$$

In the formula (II) above, H was the gap distance (mm) between the glass plate and the upper mold and the gap distance between the glass plate and the lower mold. T is the resin temperature, and in the experiments, T was the temperature of the heater at cylinder nozzle base (NH) (Table 1). Also, C was the heat capacity $(J/(m^3 \cdot K))$ of the resin at resin temperature T. Further, Tc was the resin flow stop temperature (° C.). Tw was the aforementioned metal mold temperature (° C.), and λ was the thermal conductivity (W/mK).

Also, n in formula (II) was the converted viscosity and was obtained by the formula of the Cross-WLF model. When doing so, the shear rate y (1/s) was obtained $y = 6354.6e^{18622H}$, where H was the aforementioned gap distance (mm) between the upper and lower molds.

As an example, Table 2 presents, for each Resin R3 trial, the molding conditions, the resin physical properties, the measured resin pressure $P_R$, the calculated/estimated values for calculating the dimensionless number A; the dimensionless number A; and the measured flash length f.

TABLE 1

| | Heaters | HP (Bottom of Hopper) | H1 | H2 | H3 | NH (Nozzle Base) | LHN (Nozzle Tip) |
|---|---|---|---|---|---|---|---|
| Resin R1 | Cylinder Temperature Conditions 1a | 60° C. | 170° C. | 180° C. | 210° C. | 210° C. | 230° C. |
| | Cylinder Temperature Conditions 1b | 60° C. | 160° C. | 170° C. | 190° C. | 200° C. | 200° C. |
| Resin R2 | Cylinder Temperature Conditions 2a | 60° C. | 160° C. | 170° C. | 180° C. | 180° C. | 180° C. |
| | Cylinder Temperature Conditions 2b | 60° C. | 150° C. | 150° C. | 160° C. | 160° C. | 180° C. |
| Resin R3 | Cylinder Temperature Conditions 3a | 60° C. | 160° C. | 170° C. | 180° C. | 180° C. | 180° C. |
| | Cylinder Temperature Conditions 3b | 60° C. | 150° C. | 150° C. | 160° C. | 160° C. | 180° C. |

55

TABLE 2

| Resin R3 Trial No | Holding Pressure Pm [MPa] | Resin Temperature T [° C.] | Mold Temperature Tw [° C.] | Holding Pressure Duration l [sec] | Injection Speed V [mm/s] | Injection Flow Rate Fw [mm³/s] | Gap Distance H [mm] |
|---|---|---|---|---|---|---|---|
| 1 | 20 | 180 | 40 | 20 | 60 | 57,727 | 0.2 |
| 2 | 30 | 180 | 40 | 20 | 60 | 57,727 | 0.2 |
| 3 | 40 | 180 | 40 | 20 | 60 | 57,727 | 0.2 |
| 4 | 50 | 180 | 40 | 20 | 60 | 57,727 | 0.2 |

TABLE 2-continued

| 5 | 20 | 180 | 40 | 20 | 60 | 57,727 | 0.2 |
|---|---|---|---|---|---|---|---|
| 6 | 30 | 180 | 40 | 20 | 60 | 57,727 | 0.2 |
| 7 | 40 | 180 | 40 | 20 | 60 | 57,727 | 0.2 |
| 8 | 50 | 180 | 40 | 20 | 60 | 57,727 | 0.2 |
| 9 | 20 | 180 | 40 | 20 | 60 | 57,727 | 0.3 |
| 10 | 50 | 180 | 40 | 20 | 60 | 57,727 | 0.05 |

| Resin R3 Trial No. | Viscosity $\rho$ [kg/m$^2$] | Heat Capacity Co [J/(kg · K)] | Heat Capacity C [J/(m$^3$ · K)] | Thermal Conductivity $\lambda$ [W/mK] | Resin Flow Stop Temperature Tc [° C.] | Resin Pressure Pp [MPa] | Virtual Solidification Time ts [sec] | Virtual Viscosity $\eta$ [Pars] | Shear Rate [1/s] | Dimensionless Number A [—] | Flash Length [mm] |
|---|---|---|---|---|---|---|---|---|---|---|---|
| 1 | 1080 | 1760 | 1.30E+06 | 0.172 | 147.3 | 4 | 1.68E−02 | 1.091 | 2.63E+05 | 6.18E+04 | 0.57 |
| 2 | 1080 | 1760 | 1 90E+06 | 0.172 | 147.3 | 18 | 1.68E−02 | 1.091 | 2.63E+05 | 2.78E+05 | 1.15 |
| 3 | 1080 | 1760 | 1.90E+06 | 0.172 | 147.3 | 20 | 1.68E−02 | 1.091 | 2.63E+05 | 4.32E+05 | 2.73 |
| 4 | 1080 | 1760 | 1.90E+06 | 0.172 | 147.3 | 39 | 1.68E−02 | 1.091 | 2.63E+05 | 6.02E+05 | 4.75 |
| 5 | 1088 | 1730 | 1 87E+06 | 0.172 | 147.3 | 2 | 6.43E−03 | 2.050 | 2.63E+05 | 6.27E+03 | 0 |
| 6 | 1080 | 1730 | 1.87E+06 | 0.172 | 147.3 | 2 | 6.43E−03 | 2.060 | 2.63E+05 | 6.27E+03 | 0.06 |
| 7 | 1080 | 1730 | 1.87E+06 | 0.172 | 147.3 | 17 | 6.43E−03 | 2.050 | 2.63E+05 | 5.33E+04 | 0.41 |
| 8 | 1080 | 1730 | 1.87E+06 | 0.172 | 147.3 | 29 | 6.43E−03 | 2.050 | 2.63E+06 | 0.09E+04 | 0.89 |
| 9 | 1080 | 1730 | 1.87E+06 | 0.172 | 147.3 | 2 | 1.45E−02 | 0.467 | 1.70E+06 | 5.20E+04 | 0.84 |
| 10 | 1080 | 1760 | 1.90E+06 | 0.172 | 147.3 | 39 | 1.05E−03 | 9.968 | 1.61E+04 | 4.12E+03 | 0.27 |

Figure 8:
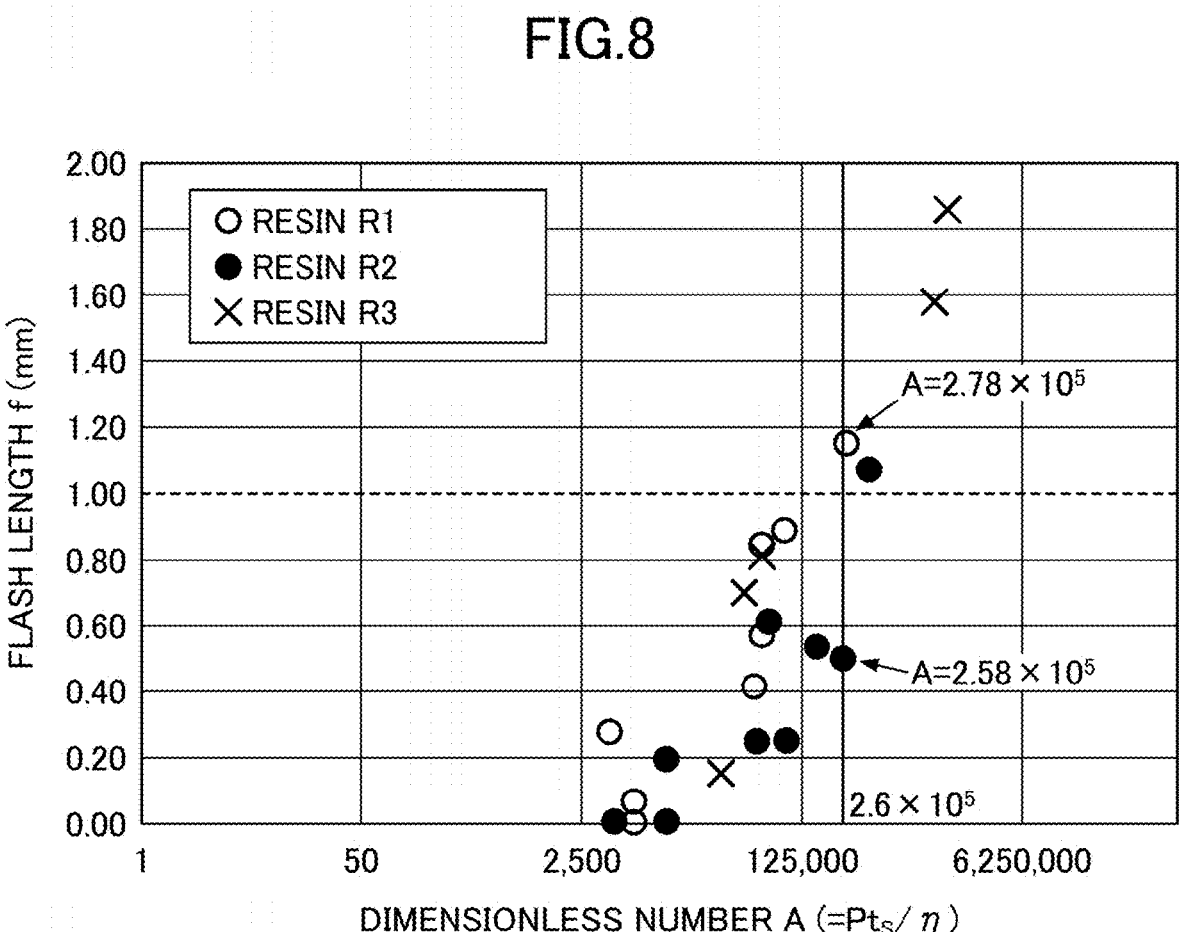
FIG. 8 illustrates results of experiments obtained in the Examples.

Further, a graph in which the relationship between the flash length f and the dimensionless number A of each test specimen for resins R1 to R3 is illustrated in FIG. 8 (the data for flash lengths exceeding 2.0 mm is omitted). It was learned from the experimental examples in FIG. 8 that the flash lengths f tend to be longer the greater the dimensionless number A is. Also, it was learned from the experimental examples that the flash length f can be kept to less than or equal to 1 mm in a case where the dimensionless number A is less than or equal to 2.6×10$^5$, for example. Therefore, by adjusting the manufacturing conditions such that the dimensionless number A does not exceed a predetermined value, flash can be kept to less than or equal to a predetermined value.

Although the present disclosure has been described above based on specific embodiments, the present disclosure is not limited to these embodiments. Further, various changes, modifications, substitutions, additions, deletions, and combinations can be made to the above-described embodiments within the scope defined by the claims, which are included within the technical scope of the present disclosure.

What is claimed is:

1. A method for manufacturing a glass plate equipped with a vehicle window-type resin frame, the manufacturing method comprising:

performing injection molding of the resin frame by:

using two shaping molds having a cavity configured for the resin frame;

disposing the glass plate inside the shaping molds such that the glass plate is retained by a retaining part that is adjacent to the cavity of the shaping molds; and injecting a resin into the cavity, wherein there is at least a partial gap between the glass plate and the retaining part, in a state in which the shaping molds are clamped together, the gap has a gap distance of 0.5 mm or less, in the injection molding, information regarding at least the gap between the glass plate and the retaining part is acquired and the injection molding is controlled by utilizing the information regarding the gap, and the information regarding the gap is estimated from either or both of pressure and displacement of the glass plate.

2. The manufacturing method according to claim 1, wherein the information regarding the gap is the gap distance.

3. The manufacturing method according to claim 1, wherein in the injection molding, a resin pressure and a mold temperature are further acquired, a characteristic value is obtained based on the information regarding the gap, the resin pressure, and the mold temperature, and a condition of the injection molding is adjusted in accordance with the characteristic value.

4. The manufacturing method according to claim 3, wherein the characteristic value is dimensionless number A represented by formula (I) below, and a condition of the injection molding is adjusted such that the dimensionless number does not exceed a target value range $$A = P_R \times ts/\eta \tag{I}$$

where, in formula (I) above, $P_R$ is the resin pressure, ts is a solidification time and is a dependent function of the gap distance and the mold temperature, and $\eta$ is converted viscosity and is a dependent function of the gap distance.

5. The manufacturing method according to claim 3, wherein the condition of the injection molding that is to be adjusted is a measuring condition for measuring resin to be injected into the shaping molds, an injecting condition for injecting the resin into the shaping molds, a pressure-holding condition for holding pressure after the injecting, a temperature condition of the shaping molds, or any combination thereof.

6. The manufacturing method according to claim 1, wherein the glass plate is curved.

7. The manufacturing method according to claim 1, wherein thermal conductivity of a material included in at least the retaining part is 10 W/mK to 500 W/mK, inclusive.

8. The manufacturing method according to claim 1, wherein the shaping molds are equipped with a hot runner.

9. The manufacturing method according to claim 1, wherein cooling piping is provided in the shaping molds, and the cooling piping and the cavity are separated from each other by a distance that is substantially same.

10. The manufacturing method according to claim 1, wherein the injection molding is gas-assisted.

11. The manufacturing method according to claim 1, wherein a deflection suppressing member is disposed in a central region of the glass plate.

12. A method for manufacturing a glass plate equipped with a vehicle window-type resin frame, the manufacturing method comprising:

performing injection molding of the resin frame by:

using two shaping molds having a cavity configured for the resin frame;

disposing the glass plate inside the shaping molds such that the glass plate is retained by a retaining part that is adjacent to the cavity of the shaping molds; and injecting a resin into the cavity, wherein there is at least a partial gap between the glass plate and the retaining part, in a state in which the shaping molds are clamped together, the gap has a gap distance of 0.5 mm or less, in the injection molding, information regarding at least the gap between the glass plate and the retaining part is acquired and the injection molding is controlled by utilizing the information regarding the gap, and in the injection molding, a resin pressure and a mold temperature are further acquired, a characteristic value is obtained based on the information regarding the gap, the resin pressure, and the mold temperature, and a condition of the injection molding is adjusted in accordance with the characteristic value.

\*　\*　\*　\*　\*